United States Patent
Kolcz

(10) Patent No.: US 10,229,163 B1
(45) Date of Patent: Mar. 12, 2019

(54) DETERMINING TOPIC INTEREST AND/OR TOPIC EXPERTISE AND GENERATING RECOMMENDATIONS BASED ON TOPIC INTEREST AND/OR EXPERTISE

(71) Applicant: Twitter, Inc., San Francisco, CA (US)

(72) Inventor: Alek Kolcz, Seattle, WA (US)

(73) Assignee: Twitter, Inc., San Francisco, CA (US)

( * ) Notice: Subject to any disclaimer, the term of this patent is extended or adjusted under 35 U.S.C. 154(b) by 799 days.

(21) Appl. No.: 14/836,489

(22) Filed: Aug. 26, 2015

Related U.S. Application Data

(60) Provisional application No. 62/041,776, filed on Aug. 26, 2014.

(51) Int. Cl.
  *G06F 17/30* (2006.01)
  *H04L 29/08* (2006.01)

(52) U.S. Cl.
  CPC .. *G06F 17/30528* (2013.01); *G06F 17/30867* (2013.01); *H04L 67/10* (2013.01); *H04L 67/306* (2013.01)

(58) Field of Classification Search
  CPC .................................................. H04N 21/812
  USPC .................................. 707/705, 706; 725/42
  See application file for complete search history.

(56) References Cited

U.S. PATENT DOCUMENTS

| | | | |
|---|---|---|---|
| 9,489,458 B1 * | 11/2016 | Haugen | G06Q 50/01 |
| 9,514,198 B1 * | 12/2016 | Haugen | G06Q 50/01 |
| 9,754,037 B2 * | 9/2017 | Ayan | G06F 17/30867 |
| 9,916,629 B2 * | 3/2018 | Rubinstein | G06Q 50/01 |
| 2011/0029521 A1 * | 2/2011 | Thayne | G06F 17/30943 707/737 |
| 2012/0191786 A1 * | 7/2012 | Downing | G06Q 10/107 709/206 |
| 2012/0296967 A1 * | 11/2012 | Tao | G06Q 30/0251 709/204 |
| 2013/0090163 A1 * | 4/2013 | Edson | A63F 13/335 463/31 |
| 2018/0018327 A1 * | 1/2018 | Fleischman | G06F 17/30029 |

\* cited by examiner

*Primary Examiner* — Baoquoc N To
(74) *Attorney, Agent, or Firm* — Fish & Richardson P.C.

(57) ABSTRACT

A method for providing recommendations involves obtaining a first topic group (TG) associated with a first expertise topic, the first TG specifying a first plurality of accounts, selecting a second TG that specifies a second plurality of accounts, making a first determination that one of the second plurality of accounts is specified in the first TG, based on the first determination, analyzing the second plurality of accounts to determine whether the second TG is associated with the first expertise topic, based on the analysis making a second determination that the second TG is associated with the first expertise topic, generating a recommendation for a first account based on a third determination that the first account is related to an account in the first plurality of accounts or an account in the second plurality of accounts, and providing the recommendation to the first account.

21 Claims, 8 Drawing Sheets

DETERMINING TOPIC INTEREST AND/OR TOPIC EXPERTISE AND GENERATING RECOMMENDATIONS BASED ON TOPIC INTEREST AND/OR EXPERTISE

CROSS-REFERENCE TO RELATED APPLICATIONS

This application claim priority to U.S. Provisional Application No. 62/041,776 filed on Aug. 26, 2014, which is hereby incorporated by reference in its entirety.

BACKGROUND

Users of social networks typically provide direct information about themselves including, for example, their specific interests. This information may then be utilized by the social networks to provide additional services to the users. However, if the user does not provide any or very limited direct information about themselves, then the social network's ability to provide additional relevant services to the users is limited.

SUMMARY

In general, in one aspect, the invention relates to a method for providing recommendations, comprising obtaining a first topic group (TG) associated with a first expertise topic, wherein the first TG specifies a first plurality of accounts, selecting a second TG that specifies a second plurality of accounts, making a first determination that at least one of the second plurality of accounts is specified in the first TG, based on the first determination, analyzing the second plurality of accounts to determine whether the second TG is associated with the first expertise topic, based on the analysis making a second determination that the second TG is associated with the first expertise topic, generating a recommendation for a first account based on a third determination that the first account is related to at least one selected from a group consisting of at least one of the first plurality of accounts and at least one of the second plurality of accounts, wherein the first account is not specified in the first TG and is not specified in the second TG, and providing the recommendation to the first account.

In general, in one aspect, the invention relates to a non-transitory computer readable medium comprising instructions that, when executed by a computer processor, perform a method for providing recommendations, the method comprising obtaining a first topic group (TG) associated with a first expertise topic, wherein the first TG specifies a first plurality of accounts, selecting a second TG that specifies a second plurality of accounts, making a first determination that at least one of the second plurality of accounts is specified in the first TG, based on the first determination, analyzing the second plurality of accounts to determine whether the second TG is associated with the first expertise topic, based on the analysis making a second determination that the second TG is associated with the first expertise topic, generating a recommendation for a first account based on a third determination that the first account is related to at least one selected from a group consisting of at least one of the first plurality of accounts and at least one of the second plurality of accounts, wherein the first account is not specified in the first TG and is not specified in the second TG, and providing the recommendation to the first account.

In general, in one aspect, the invention relates to a system for providing recommendations, comprising a computer processor, a social network platform configured to connect to a plurality of client devices, each client device being associated with an account managed by the social network platform, and an account repository comprising a plurality of accounts which are members of the social network platform. The social network platform is configured to provide recommendations to the plurality of accounts by obtaining a first topic group (TG) associated with a first expertise topic, wherein the first TG specifies a first plurality of accounts of the plurality of accounts, selecting a second TG that specifies a second plurality of accounts of the plurality of accounts, making a first determination that at least one of the second plurality of accounts is specified in the first TG, based on the first determination, analyzing the second plurality of accounts to determine whether the second TG is associated with the first expertise topic, based on the analysis making a second determination that the second TG is associated with the first expertise topic, generating a recommendation for a first account based on a third determination that the first account is related to at least one selected from a group consisting of at least one of the first plurality of accounts and at least one of the second plurality of accounts, wherein the first account is not specified in the first TG and is not specified in the second TG, and providing the recommendation to the first account.

DETAILED DESCRIPTION

Specific embodiments of the invention will now be described in detail with reference to the accompanying figures. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description In the following description of FIGS. 1-6, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

In general, embodiments of the invention relate to a method and system for ascertaining whether an account is associated with zero, one or more expertise topics. This information may then be used to generate recommendations for one or more accounts in a social network. Further, in one or more embodiments of the invention, an iterative method is used to generate a topic ontology model(s) using expertise topics associated with the accounts in the social network. In one or more embodiments of the invention, the topic ontology model(s) may also be used to generate recommendations for one or more accounts in a social network. Embodiments of the invention may also be used to identify accounts (or individuals) that are considered experts on a particular expertise topic.

Figure 1:
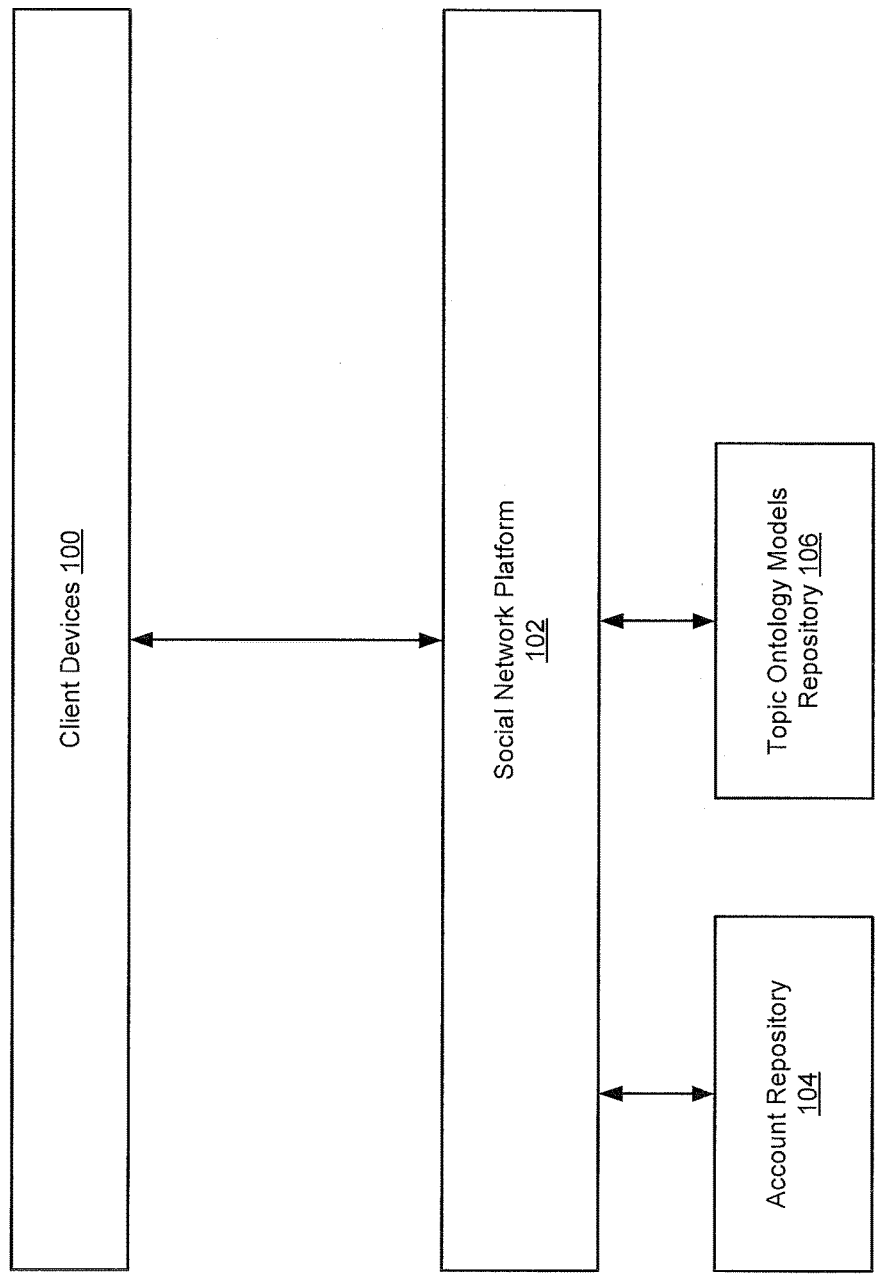
FIG. 1 shows a system in accordance with one or more embodiments of the invention in accordance with one or more embodiments of the invention.

FIG. 1 shows a system in accordance with one or more embodiments of the invention in accordance with one or more embodiments of the invention. The system includes one or more client devices (100) and a social network platform (102). Each of these components is described below.

As shown in FIG. 1, the social network platform (102) has multiple components including an account repository (104), and a topic ontology models repository (106) as well as other components that are not shown in FIG. 1. Various components of the social network platform (102) may be located on the same device (e.g., a server, mainframe, desktop Personal Computer (PC), laptop, Personal Digital Assistant (PDA), telephone, mobile phone, kiosk, cable box, and any other device) or may be located on separate devices connected by a network (e.g., a local area network (LAN), the Internet, etc.) using any combination of wired and wireless connections using any combination of communication protocols. Those skilled in the art will appreciate that there may be more than one of each separate component running on a device, as well as any combination of these components within a given embodiment of the invention.

A social network platform (102) connects users to other users of the social network platform (102), exchanges platform messages between connected users of the social network platform (102), and provides an interface for a user (e.g., via client devices (100)) to create and view platform messages and other content (e.g., recommendations). In one or more embodiments of the invention, platform messages may be broadcast (or multicast) platform messages that are transmitted to at least a set of users. The users in the set may be self-selected (e.g., followers of the transmitting user) or users that satisfy a certain status with the transmitting user (e.g., belong to a group such as friends, family, etc.). The platform messages may include, but is not limited to, a comment from a user, a reference to a geographic location, personal status update, an official statement by a user representing an organization, a reference to another user of the social network, one or more terms descriptive of the message, an offer to buy or sell goods, and other information not listed above. The platform messages may also include, but is not limited to, text, universal resource locators (URLs), pictures, media files, multimedia files, and other elements not listed above. In one or more embodiments of the invention, the social network platform (102) may include restrictions on the size of the platform messages, such as a restriction on number of characters, size of included media, and other restrictions not listed above.

In one or more embodiments of the invention, the social network platform (102) is a platform for facilitating real-time communication between one or more entities. For example, the social network platform (102) may store millions of accounts of individuals, businesses, and/or other entities (e.g., pseudonym accounts, novelty accounts, etc.). One or more users of each account may use the social network platform (102) to send platform messages to other accounts inside and/or outside of the social network platform (102). The social network platform (102) may be configured to enable users to communicate in "real-time", i.e., to converse with other users with a minimal delay and to conduct a conversation with one or more other users during concurrent (which may include simultaneous) sessions. In other words, the social network platform (102) may allow a user to broadcast (or multicast) platform messages and may display the platform messages to one or more other users within a reasonable time frame so as to facilitate a "live" conversation (or interaction) between the users. Recipients of a platform message may have a predefined graph relationship with an account transmitting the platform message. In one or more embodiments of the invention, the user is not an account holder or is not logged in to an account of the social network platform (102). In this case, the social network platform (102) may be configured to allow the user to transmit platform messages and/or to utilize other functionality of the social network platform (102) by associating the user with a temporary account or identifier.

Figure 3:
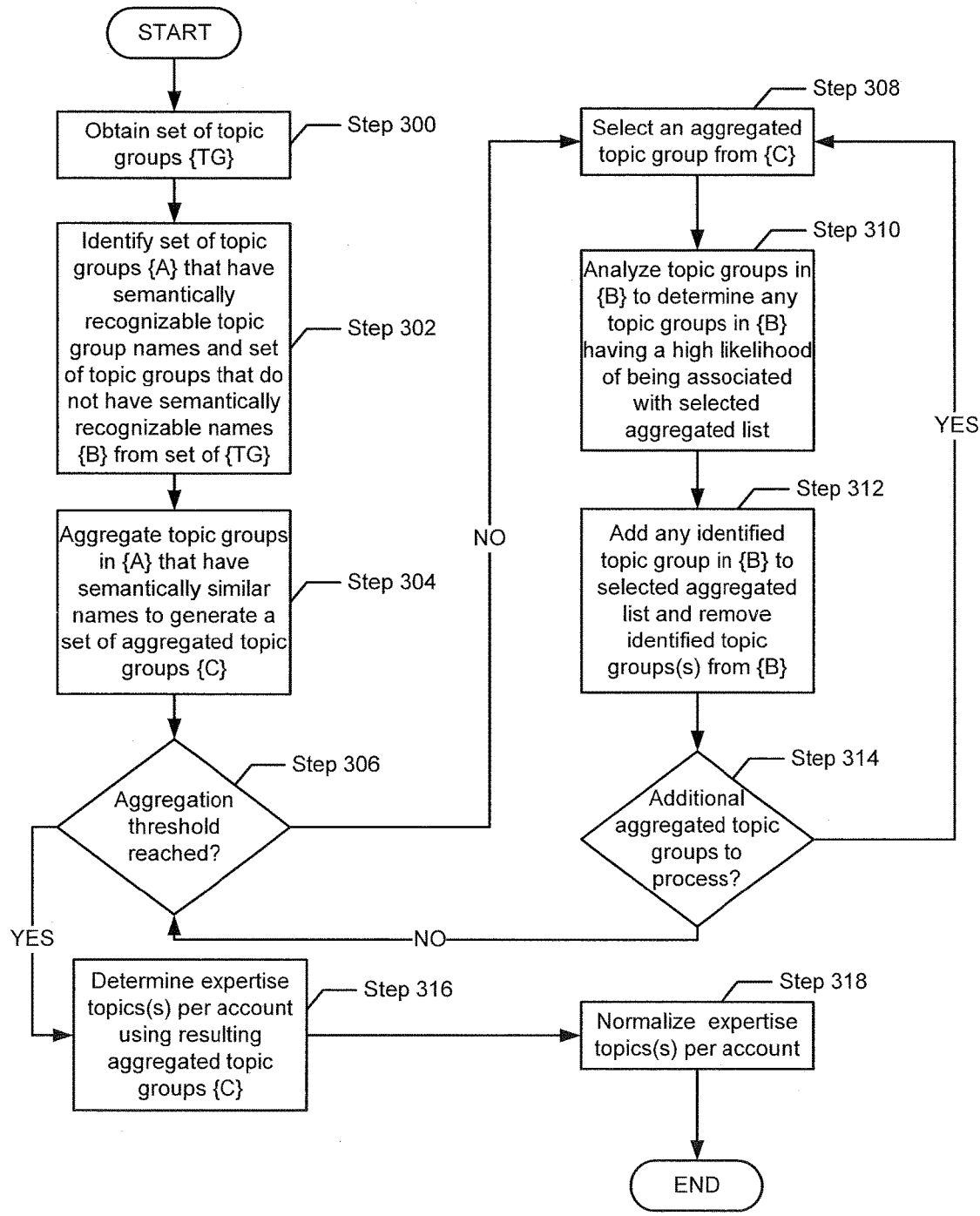
FIG. 3 shows a method for determining the expertise topics associated with a given account in accordance with one or more embodiments of the invention.
Figure 4:
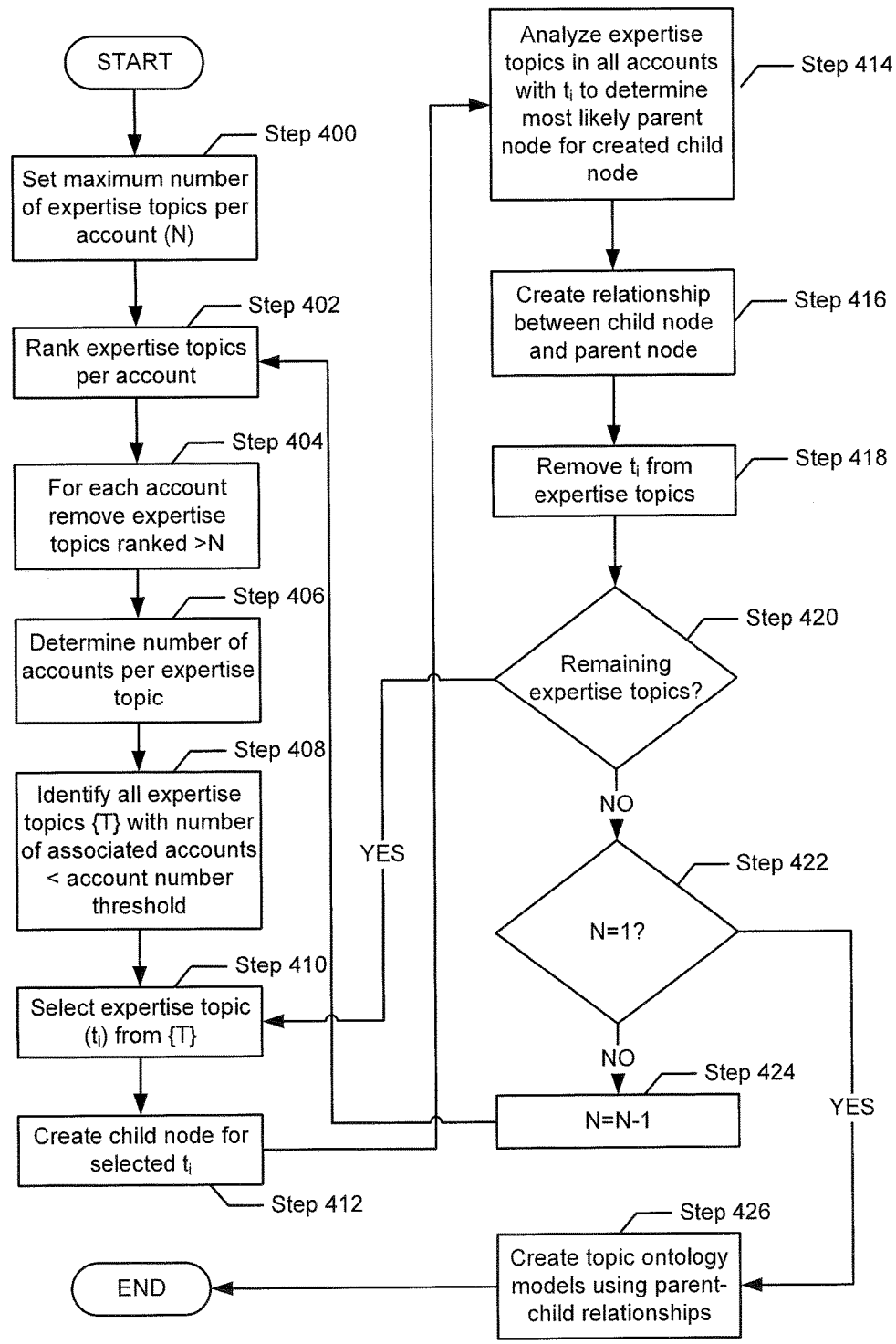
FIG. 4 shows a method for generating a topic ontology based on the expertise topics associated with accounts in accordance with one or more embodiments of the invention.
Figure 5:
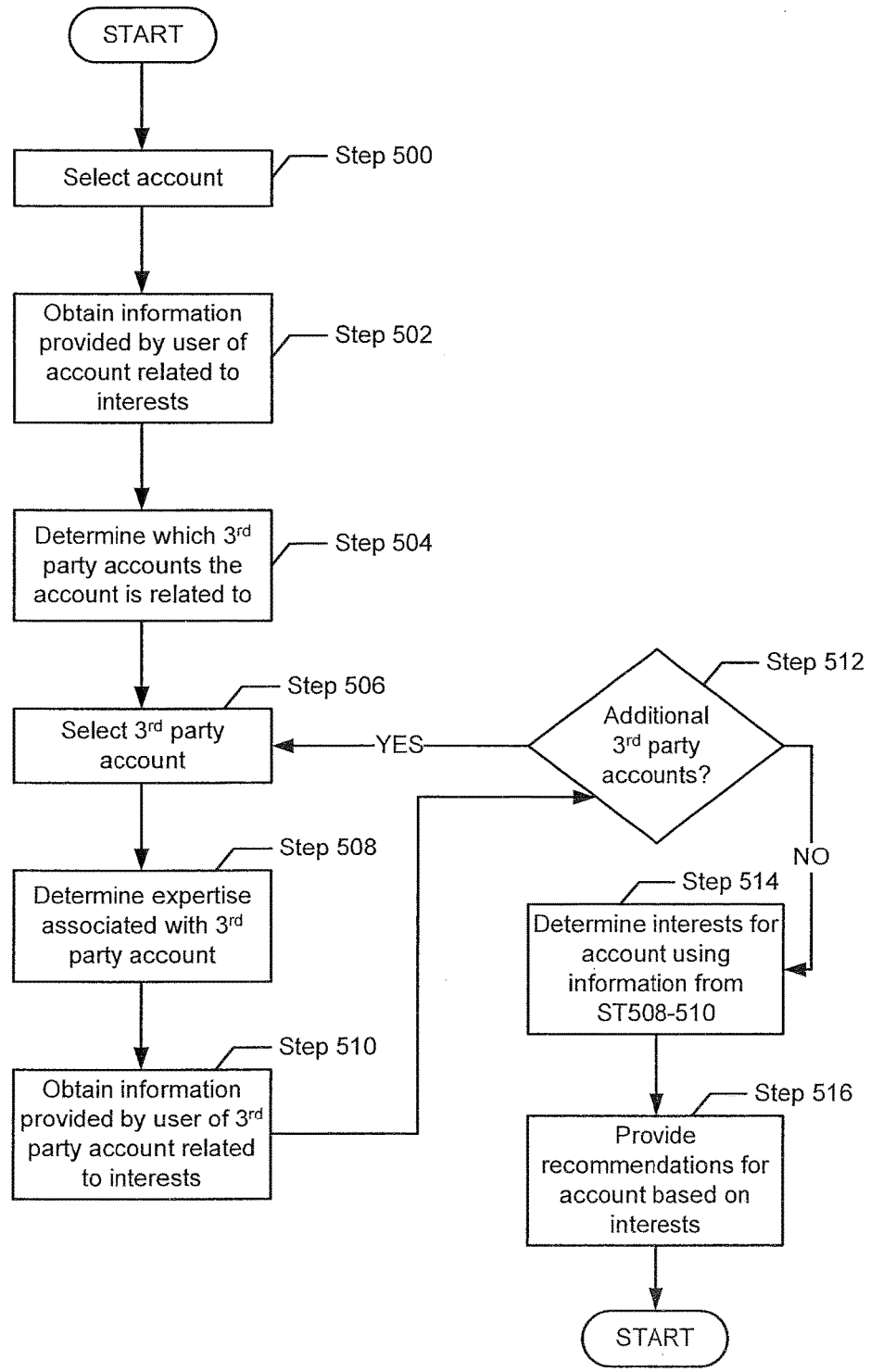
FIG. 5 shows a method for determining one or more interests for an account in accordance with one or more embodiments of the invention.

In one or more embodiments of the invention, the social network platform includes functionality to perform the methods shown in FIGS. 3-5.

In one or more embodiment of the invention, a client device (100) corresponds to any computing system (as described below in FIG. 6) that is configured to interface with the social network platform (102). For example, a client device may include a web browser application that enables the user of the client device to interface with the social network platform. In this example, the website that the user accesses, via the web browser application, may be a website for the social network platform (e.g., www.twitter.com) or may be a website that includes embedded content from the social network platform but is not a website for the social network platform (e.g., www.cnn.com may include embedded content from one or more social network platforms). In another example, the client device may have loaded thereon one or more applications provided by the social network platform that enables the user of the client device to interact with the social network platform, e.g., Twitters iOS application. In another example, the client device may have loaded thereon an application(s) that includes embedded content (e.g., platform messages, recommendations) created and/or distributed by the social network platform (or by $3^{rd}$ parties), where such applications access the content from the social network platform via APIs (or other mechanisms) provided by the social network platform.

In one or more embodiments of the invention, the client devices are configured to interface with the social network platform using a frontend module (not shown) associated with the social network platform. In one embodiment of the invention, the frontend module is a software application or a set of related software applications configured to communicate with external entities (e.g., a client device (100)). The frontend module may include the application programming interface (API) and/or any number of other components used for communicating with entities outside of the social network platform (102). The API may include any number of specifications for making requests from and/or providing data to the social network platform (102).

In one or more embodiments of the invention, a user may use any client device (100) to receive the platform messages. For example, when the user uses a web-browser application executing on the client device to access the social network platform (102), an API of the frontend module may be utilized to define one or more streams and/or to serve the stream data to the client device for presentation to the user.

In one or more embodiments of the invention, the account repository (104) stores information about accounts in the social media platform. Specifically, the account repository (104) may store account data items that include information about a location of a user (or entity that controls the account), a self-description of the user (or entity that controls the account), one or more interests associated with the account, one or more expertise topics associated with the account. The information stored in an account repository may be provided by a user of the account, may be provided by an entity associated with the account (e.g., information provided by a company if the company controls the account), may be generated in accordance with FIG. 3, FIG. 5, and/or may be generated in accordance with any other mechanism. In one or more embodiments of the invention, the account repository may also include topic groups (defined below in FIG. 2). Alternatively, the topic groups may be maintained in another repository (not shown) in the social network platform. The account repository may include additional or other information about the account without departing from the invention.

In one embodiment of the invention, the topic ontology models repository (106) includes one or more topic ontology models generated in accordance with the method shown in FIG. 4. The topic ontology model repository may also include topic ontology models not generated in accordance with FIG. 4.

Though not shown in FIG. 1, in one or more embodiments of the invention, the social network platform may include a message repository, where the message repository includes functionality to store message data items that include platform messages and platform messages metadata. The platform messages metadata may include, but is not limited to, an identifier of the originating account of the platform message, a list of accounts who received the platform message, a number of accounts who received the platform message, statistics (e.g., a ratio of connected accounts to the originating account that forward the platform message versus disconnected users to the originating account that forward the platform message), time and date in which the platform message is transmitted, and other information. The message repository may include additional or other information about each platform message without departing from the invention.

In one embodiment of the invention, the message repository (not shown) tracks which accounts interact with a given message and how the accounts interact with a given message. The following describes non-limiting engagement examples: A social network platform user "Mary" authors the message "I like Coffee Co.'s new flavors!" and submits it to the social network platform. Mark reads the message on the social network platform, and reposts the message using his own account in the form "Repost @Mary: 'I like Coffee Co.'s new flavors!'". Mark has engaged with Mary's message. Alison also sees Mary's message, and composes a message in response taking the form "I do too! @Mary: 'I like Coffee Co.'s new flavors!'". Alison has engaged with Mary's message. Finally, John sees Mary's message and clicks an "Agree" button next the message as displayed on the social network platform website. John has engaged with the message. In one or more embodiments of the invention, the engagement by Mark and Alison, and John is tracked using the engagement data items.

In one or more embodiments of the invention, each engagement data item includes a message identifier (an identifier that uniquely identifies the platform message within the message repository), an engaging account identifier, an engagement type, an engagement source, an engagement timestamp, and an engagement location. Each of the aforementioned components is described below except for message identifier which has been previously described.

In one or more embodiments of the invention, the engaging account identifier identifies the account engaging with the message. In one or more embodiments of the invention, the engagement type identifies the type of engagement. The engagement type may be one of a set of identifiers that refer to a different kind of engagement. Engagement types may include, but are not limited to, "view", "repost", "reply", and "agree". In one embodiments of the invention each engagement type is associated with an engagement weight, which may be used to convey the relative level of engagement between different types of engagement types. For example, a "click-through" engagement type (e.g., when a user of an account clicks on a link included within the platform message) may have a greater engagement weight than a "view/expand" engagement type (e.g., when an entity expands the visible portion of the platform message such that the user of the account can view the entire message content). The engagement weight may be stored within the engagement data item, for example, as part of the engagement type. Alternatively, the engagement weight for each engagement type may be maintained in a separate location in the social network platform.

In one or more embodiments of the invention, the engagement source identifies the client device type though which the account was engaging with the platform message. Specifically, the engagement source identifies the mechanism used by the engaging account to repost, distribute, respond, and otherwise engage with the platform message. The engagement source may identify, for example, a website that interacts with the frontend of the social network platform, an application on a mobile device, or a desktop application.

In one or more embodiments of the invention, the engagement timestamp is a record of the time the engagement occurred. In one or more embodiments of the invention, the engagement timestamp includes the time zone in which the time was recorded. In one or more embodiments of the invention, the engagement location is a record of the geographic location from which the account engaged with the platform message. The engagement location may be global positioning satellite coordinates submitted to the social network platform with the engagement (e.g., as recorded by the client device at the time of the engagement).

In one or more embodiments of the invention, an engagement type of "view" indicates that the platform message was viewed. The platform message may be viewed on a client that is implementing a client version of the social network platform (e.g., a mobile Twitter application executing on a smart phone). In another embodiment of the invention, a "view" may also indicate that the platform message was viewed on a website in which it was embedded. For example, a widget may be embedded on a website where the widget shows platform messages. The widget may concurrently show multiple platform messages and the specific platform message(s) that the widget displays may change over time. When a platform message is presented via the widget and/or a user clicks on the platform message within the widget, an engagement data item is created, where the engagement data item indicates an engagement type of "view" and also includes the universal resource locator (URL) and/or any other data identifies the website on which the particular platform message was displayed.

The invention is not limited to the engagement data item described above.

Continuing with the discussion of FIG. 1, in one or more embodiments of the invention, one or more of the aforementioned repositories may be implemented as a storage service using service-oriented architecture (SOA) and configured to receive requests for data and to provide requested data to other components of the social network platform (102). In another example, one or more of the aforementioned repositories may include one or more tables in a distributed database management system (DBMS), a clustered database, a standalone flat file, and/or any storage software residing on one or more physical storage devices. Examples of a storage device may include, but are not limited to, a hard disk drive, a solid state drive, and/or other memory device. Any type of database or storage application may be used, in accordance with various embodiments of the invention.

The invention is not limited to the system shown in FIG. 1

Figure 2:
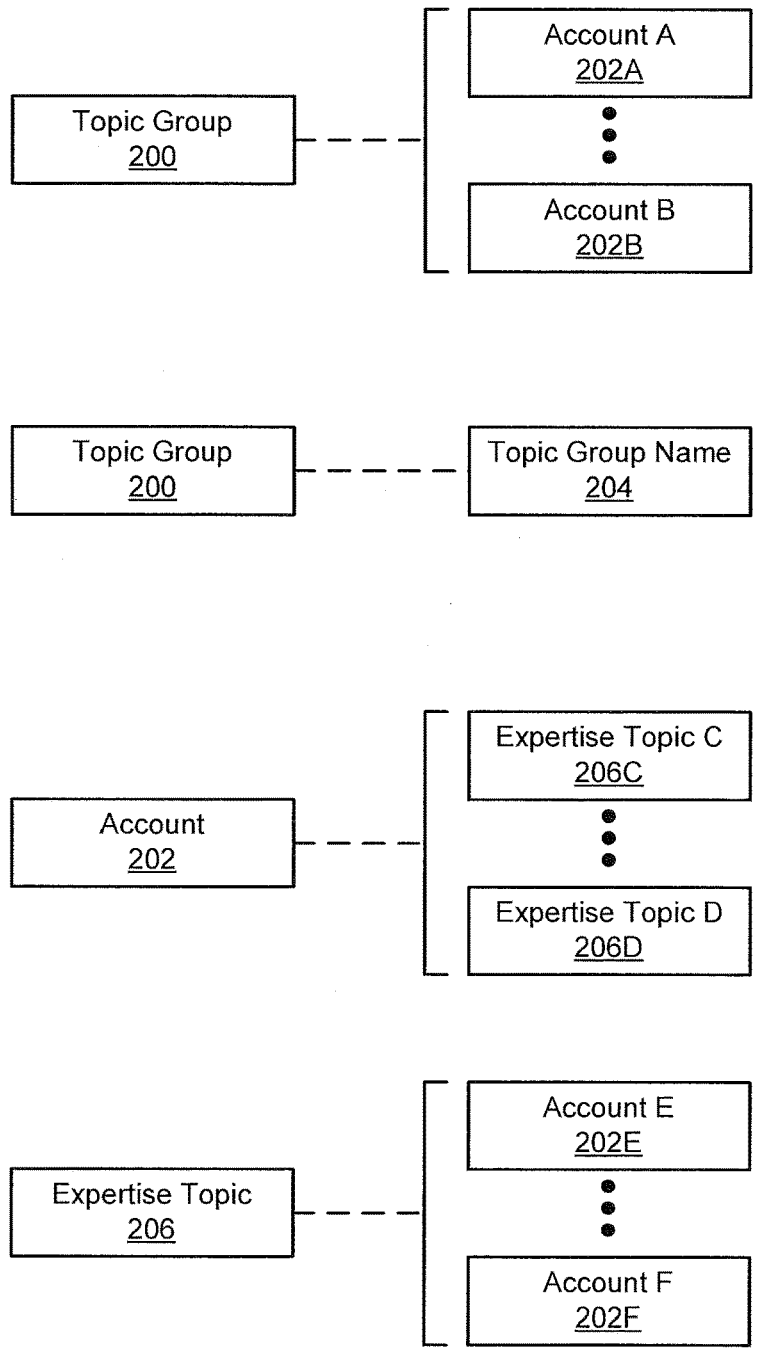
FIG. 2 shows relationships between various components in the system in accordance with one or more embodiments of the invention.

FIG. 2 shows relationships between various components in the system in accordance with one or more embodiments of the invention. As discussed above, the social network platform includes one or more topic groups. Each topic group (200) includes a topic group name (204) and one or more accounts (202A, 202B), where the topic group name (204) may be any letter, word, phrase, numeric identifier, or alpha-numeric string. After the processing is performed in FIG. 3, each account (202) may be associated one zero, one or more expertise topics (206C, 206D). Further, each expertise topic (206) may be associated with one or more accounts (202E, 202F). Said another way, there may be multiple accounts with the same expertise topic (206).

In one or more embodiments of the invention, the topic groups may be generated by users of the social network platform, by the social network platform, by $3^{rd}$ parties that are not users of the social network platform or by any combination thereof.

FIGS. 3-5 show flowcharts for various methods in accordance with one or more embodiments of the invention. While the various steps in these flowcharts are presented and described sequentially, one of ordinary skill will appreciate that some or all of the steps in the flow charts may be executed in different orders, may be combined or omitted, and some or all of the steps may be executed in parallel. Further, the methods described in the following flowcharts may be performed in parallel by the social network platform.

FIG. 3 shows a method for determining the expertise topics associated with a given account in accordance with one or more embodiments of the invention. More specifically, FIG. 3 describes an iterative method for processing topic groups (TGs) in order to determine zero, one or more expertise topics per account.

In step 300, one or more topic groups (TGs) are obtained. The TGs obtained in step 300 may be referred to as a set of TGs and denoted as {TG}. The TGs may be obtained by the social network using any known mechanism.

In step 302, the TGs in the {TG} are analyzed to determine whether they have topic group names that are semantically recognizable. A topic group name is semantically recognizable if an expertise topic may be determined from the topic group name. The results of the analysis is two sets—{A} that includes all TGs that have semantically recognizable names and {B} that includes all TGs that do not have semantically recognizable names. For example, TGs with the topic group names of "Basketball", "B-Ball", and "NBA Basketball" would be considered to have semantically recognizable names. Alternatively, TGs with topic group names such as "1", "B2", "CXZ" would not be considered to have semantically recognizable names. Any known mechanism for ascertaining whether the topic group names are semantically recognizable may be used without departing from the invention.

In step 304, the TGs in {A} are analyzed to determine whether two or more TGs in the {A} have semantically similar names. The result is a set of aggregated TGs {C}, where each aggregated {TG} includes the TGs that have semantically similar names. For example, if there are three topic groups with the following topic group names: "Basketball", "B-Ball", "NBA Basketball", then these TGs may be aggregated to generate a single aggregated TG that includes all accounts included within each of the aforementioned three TGs and an aggregated topic group name(s). The aggregated topic group name may include all three of the aforementioned topic group names, a single topic group name selected from the three aforementioned topic group names or may be a topic name that is derived by the social network platform (or the entity performing the method in FIG. 3). In one embodiment of the invention, each of the aggregated TGs may be represented as a set of individual TGs that have semantically similar names. In such a scenario, {C} is a set of sets where each set is a subset set of TGs from {A}. Further, in this scenario, the subset of TGs may be associated with an aggregated topic group name. In one or more embodiments of the invention, {C} may also include individual TGs that do not have semantically similar names to any of the other TGs in {A}.

In step 306, a determination is made about whether an aggregation threshold is reached. The aggregation threshold is used to determine whether (i) all TGs in {B} have been associated with an expertise topic or (ii) a sufficient number of TGs in {B} have been associated with an expertise topic such that the process may proceed to step 316. For example, if there are 100 topic groups and only 10 remaining topic groups in {B} that are not associated with an expertise topic, then the aggregation threshold may be deemed to be reached. Those skilled in the art will appreciate that other factors aside from the number of remaining topic groups in {B} that have not been processed may be used to determine whether the aggregation threshold has been reached without departing from the invention. If the aggregation threshold is reached, the process proceeds to step 316; otherwise, the process proceeds to step 308. In one embodiment of the invention, step 306 is performed prior to each iteration of steps 308-314.

In step 308, an aggregated TG is selected from {C}. Step 308 may also include selecting non-aggregated TGs that are in {C}.

In step 310, the topic groups in {B} are then analyzed to determine whether there is a likelihood that any of the topic groups in {B} are associated with the same expertise topic as the selected aggregated TG (i.e., the TG selected in step 308). For example, if the aggregated TG selected in step 308 is associated with an aggregated topic group name "basketball" then the accounts associated with that aggregated topic group are deemed to be associated with an expertise topic of "basketball". The TGs in {B} are then analyze to first determine whether there is any overlap between the accounts specified in the aggregated TG selected in step 308 and any of the TGs in {B}, where an overlap exists between the aggregated topic group and a TG in {B} when at least one account is specified in both the aggregated TG and in a TG in {B}. Each TG in {B} that has an overlap with the aggregated topic group is then further analyzed to determine whether there is a high likelihood that accounts in the TG in {B} that overlaps with the aggregated TG are associated with the same expertise topic as the aggregated TG. The aforementioned determination may be based on: (i) TG level analysis that takes into account the extent of the overlap between the TG and the aggregated TG and/or (ii) account level analysis that takes into account the likelihood that a given account within the TG is associated with the same expertise topic that is associated with the aggregated TG, where the account level analysis is performed using information obtained from the account repository and/or the message repository. Other analysis may be performed to make the aforementioned determination without departing from the invention. The result of the analysis in step 310 is zero, one or more TGs in {B} for which there is a high likelihood that the accounts should be associated with the same expertise topic as the expertise topic associated with the aggregated TG selected in step 308.

In step 312, the TGs (if any) identified in step 310 are combined with the selected aggregated topic group in order to generate an updated aggregated topic group, where the updated aggregated topic group may be a single aggregated topic group or a set of TGs (as described in Step 302). Further, the TGs identified in step 310 are removed from {B}.

In step 314, a determination is made about whether there are any additional aggregation TGs to process in {C}. If there are additional to process in {C}, then the process proceeds to step 306; otherwise, the process proceeds to step 316. In one embodiment of the invention, each aggregation group in {C} is processed at most once per iteration.

In step 316, the aggregated topic groups generated via the one or more iterations of steps 308-314 are analyzed to determine what accounts are associated with which expertise topics. The result of step 316 is a mapping of accounts to one or more expertise topics. Those skilled in the art will appreciate that the accounts associated with expertise topics in step 316 may only be a subset of accounts in the social network.

In step 318, the expertise topics associated with each account are normalized. In one embodiment of the invention, each account may only have up to a maximum number of associated expertise topics, e.g., two per account. If a given account has more than two associated expertise topics, the particular account is analyzed to determine which of the expertise topic(s) has the highest likelihood of being associated with the account. Said another way, the particular account is analyzed to determine which subset of expertise topics best reflect the particular account's expertise. The analysis of a given account may be based on information in the account repository, information in the message repository, $3^{rd}$ party information, any other information, or any combination thereof.

The following is an example of the method shown in FIG. 3. The example is not intended to limit the scope of the invention. Turning to the example, consider a scenario in which there is one aggregated TG (e.g., TG 1 in Table 1) and three TGs that do not have semantically recognizable names (e.g., TG 2-4 in Table 1). The application of one or more embodiments shown of the method shown in FIG. 3 may generate the following results.

TABLE 1

| TG Number | TG Name | Accounts in TG |
| --- | --- | --- |
| 1 | Basketball | A, B, C, D, E |
| 2 | A-1 | C, D, G, H, I |
| 3 | B | B, E, J, K, L |
| 4 | TG#5 | G, H, I, M |

During a first iteration of steps 308-314, TG 2 and TG 3 are identified as TGs that have an overlap in accounts with TG 1; however, there is no overlap with TG 4 and TG 1. TG 2 and TG 3 are subsequently processed in accordance with Step 310 in FIG. 3. The results of the processing indicate that TG 2 has a high likelihood of being associated with the same expertise topic as TG 1, namely, basketball. However, even though TG 3 has the same number of accounts overlapping with TG 1, the analysis of TG 3 and the individual accounts within TG 3 (as described Step 310) indicates that there is a low likelihood that TG 3 is associated with the same expertise topic as TG 1. Based on the aforementioned results, TG 2 is merged with TG 1 to generate an updated aggregated topic group (TG 1') that is associated with the expertise topic of basketball and that specifies the following accounts: A, B, C, D, E, G, H, and I.

During a second iteration of steps 308-314, TG 3 and TG 4 are identified as TGs that have an overlap in accounts with TG 1'. TG 3 and TG 4 are subsequently processed in accordance with Step 310 in FIG. 3. The result of the processing indicates that TG 4 has a high likelihood of being associated with the same expertise topic as TG 1', namely, basketball. However, even though TG 3 has a number of accounts overlapping with TG 1', the analysis of TG 3 and the individual accounts within TG 3 (as described Step 310) indicates that there is a low likelihood that TG 3 is associated with the same expertise topic as TG 1'. Based on the aforementioned results, TG 4 is merged with TG 1' to generate a second updated aggregated topic group (TG 1") that is associated with the expertise topic of basketball and that specifies the following accounts: A, B, C, D, E, G, H, I, and M.

FIG. 4 shows a method for generating a topic ontology based on the expertise topics associated with accounts in accordance with one or more embodiments of the invention. In one embodiment of the invention, a topic ontology model specifies one or more relationships between two or more expertise topics. The process performed in FIG. 4 may be performed after one or more accounts have been associated with two or more expertise topics. In one or more embodiments of the invention, the processing in FIG. 4 uses the non-normalized set of expertise topics associated with each account.

In step 400, a maximum number of expertise topics per account (N) is specified. For example, each account may only have up to ten expertise topics.

In step 402, the expertise topics associated with each account are ranked on a per-account basis such that every account that is associated with two or more expertise topics includes a ranked list of expertise topics with which the account is associated. The ranking of expertise topics for a given account may be performed using any known ranking method and may include using information about the account obtained from the account repository and/or from the message repository. The ranking may also be performed using information that is obtained from $3^{rd}$ party sources that are external to the social network platform. In one or more embodiments of the invention, the ranking indicates the relative strength of expertise of the account for various expertise topics. For example, if a given account includes the following ranking of expertise topics: basketball, politics, and fashion, the account is deemed to have relatively more expertise in basketball than in politics and to have relatively more expertise in politics than in fashion.

In step 404, for each account that is associated with greater than N expertise topics, only the top N expertise topics for the account are retained (for purposes of this method) and the remaining expertise topics are removed. Those skilled in the art will appreciate that the social network platform may maintain a listing of all expertise topics associated with the account.

In step 406, the accounts associated with the expertise topics are then analyzed to determine how many accounts are associated with each expertise topic. The account processed in Step 406 correspond to accounts that have less than or equal to N expertise topics (based on the processing performed in step 404).

In step 408, all expertise topics associated with less than an account threshold number of accounts are identified. The result is a set of expertise topics {T}. For example, if the account threshold number is four, then expertise topics associated with less than four accounts are identified. In step 410, an expertise topic $t_i$ is selected from {T}. In step 412, a child node is created for the selected $t_i$.

In step 414, all accounts associated with expertise topic $t_i$ are then analyzed to determine the most likely parent node for the created child node (i.e., the child node created in 412). More specifically, each of the aforementioned accounts is analyzed to determine the highest ranked expertise topic of the remaining expertise topics associated with the account. The highest ranked expertise topics associated with the aforementioned accounts are then analyzed to determine the expertise topic with the highest likelihood of being a parent node for the created child node.

In step 416, a parent-child relationship between the child node (created in step 412) and the parent node (created in step 416) is created. The parent-child relationship between the parent and child node indicates that the expertise topic of the parent node includes the expertise topic of the child node. For example, the parent node may include an expertise topic of winter sports and the child node may include an expertise topic of figure skating. In step 418, $t_i$ is removed from {T}.

In step 420, a determination is made about whether there are additional expertise topics remaining in {T}. If there are additional expertise topics remaining in {T}, the process proceeds to Step 410; otherwise the process proceeds to 422. In step 422, a determination is made about whether N=1. If N=1, the process proceeds to step 426; otherwise the process proceeds to step 424. In step 424, N is decremented to by 1 and then the process proceeds to step 402.

In step 426, the individual parent-child relationships created during the one or more iterations of steps 404-424 are combined into one or more topic ontology models. For example, if the following parent-child relationships were created: (i) Olympics→winter sports and (ii) winter sports-→figure skating. Then in step 426 the following topic ontology model may be created: Olympics→winter sports-→figure skating.

In one or more embodiments of the invention a topic ontology model is created each time FIG. 4 is performed. Alternatively, successive iterations of FIG. 4 result in a single topic ontology model that is updated each time FIG. 4 is performed.

The following is an example of the method shown in FIG. 4. The example is not intended to limit the scope of the invention. Turning to the example, consider a scenario in which, after step 408, the number of accounts with associated with each expertise topics is shown in Table 2.

TABLE 2

| Expertise Topic | Number of Accounts associated with Expertise Topic |
| --- | --- |
| Politics | 100 |
| Music | 80 |
| Fashion | 58 |
| Winter Sports | 15 |
| Basketball | 14 |
| Olympics | 8 |
| Figure Skating | 3 |

For purposes of this example assume that the account threshold is four. Accordingly, because the expertise topic figure skating is associated with less than four accounts, a child node for figure skating is created and the three accounts associated with the expertise topic of figure skating are selected. The three aforementioned accounts are shown below in Table 3.

TABLE 3

| Account | Expertise Topics |
| --- | --- |
| 1 | figure skating, winter sports, Olympics, fashion |
| 2 | figure skating, winter sports, politics |
| 3 | figure skating, Olympics, music |

Continuing with the example, accounts 1-3 are analyzed (as described in step 414 in FIG. 4) to determine highest ranked expertise topic if figure skating is removed from expertise topics associated with the three accounts. Based on the analysis, the highest ranked expertise topic for account 1 is winter sports, for account 2 is winter sports, and for account 3 is Olympics. The results of the aforementioned analysis are then used to determine whether there is a higher likelihood that the parent node should be associated with winter sport or Olympics. The result of this analysis is that winter sports is selected as the parent node for figure skating. Accordingly, per step 416 in FIG. 4, the following parent-child relationship is created: winter sports→figure skating. The aforementioned parent-child relationship may be combined with other parent-child relationships to generate a topic ontology model.

FIG. 5 shows a method for determining one or more interests for an account in accordance with one or more embodiments of the invention. The method shown in FIG. 5 may be performed in parallel (or during overlapping time periods) with FIGS. 3 and 4. In step 500, an account is selected. In step 502, information, provided by one or more users of the account, related to one or more interests associated with the account is obtained. This information may be obtained, e.g., from the account repository.

In step 504, a determination is made about to which $3^{rd}$ party accounts (i.e., other accounts in the social network platform) the account (selected in step 500) is related. For example, if the account is "following" a $3^{rd}$ party account then the account is deemed to be related to the $3^{rd}$ party account. In this context, when an account "follows" a $3^{rd}$ party account, the account may receive platform message that are authored by the $3^{rd}$ party account, these platform messages may be direct messages (i.e., platform messages only intended for the account) or multicast messages (i.e., message intended for all accounts that are "following" the account that authored the platform message).

In step 506, a $3^{rd}$ party account from the set of $3^{rd}$ party accounts identified in step 504 is selected. In step 508, the expertise associated with the selected $3^{rd}$ party account is determined. The result of step 508 is identifying zero, one or more expertise topics associated with the selected $3^{rd}$ party account. In step 510, information, provided by one or more users of the $3^{rd}$ party account, related to one or more interests associated with the $3^{rd}$ party account is obtained. This information may be obtained, e.g., from the account repository.

In step 512, a determination is made about whether there are additional $3^{rd}$ party accounts (which were identified in step 504) that need to be processed. If there are additional $3^{rd}$ party accounts to process, the method proceeds to step 506; otherwise the method proceeds to step 514.

In step 514, the information obtained in steps 302-310 is used to determine one or more interests associated with the account identified in step 500. For example, by analyzing the expertise topics associated with the $3^{rd}$ party accounts with which the selected account is related, the social network platform can ascertain whether there is a high likelihood that the account should be associated with an interest corresponding to an expertise topic or an interest topic of one or more $3^{rd}$ party accounts with which the selected account is related. The result of step 514 is one or more interests identified for the selected account.

In step 516, the social network platform provides one or more recommendations for the selected account based on the identified interest in step 514. For example, the recommendations may include one or more of the following.

In one embodiment of the invention, the recommendation indicates one or more $3^{rd}$ party accounts that the account should be following. The $3^{rd}$ party accounts to follow may be associated with expertise topics corresponding to the interest for the account. For example, if the interest is basketball, then the recommendation may include $3^{rd}$ party accounts that are associated with an expertise topic of basketball. In another example, the $3^{rd}$ party accounts may be associated with an expertise topic that is related to the interest of the account. For example, if the account is associated with an interest of figure skating, the social network platform may analyze one or more topic ontology models in order to determine related topics of interest. In this example, a topic ontology model may indicate that figure skating is related to winter sports (e.g., because winter sports is in a parent node that is directly connected to a child node that includes figure skating). Accordingly, in this example, $3^{rd}$ party accounts to follow may include accounts that are associated with expertise topics that include figure skating and/or winter sports.

In one embodiment of the invention, the recommendations are presented to one or more users of the account via one or more client devices.

Figure 8:
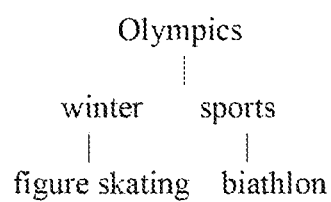
FIG. 8 shows a topic ontology model.

Those skilled in the art will appreciate that one or more topic ontology models may be used to determine related topics. Further, the interests determined using the topic ontology models may include (i) topics that are directly or indirectly connected to a node that includes a topic of the account, e.g., if the account has an interest of figure skating and the topic ontology model is as follows: Olympics→winter sports→figure skating, then interests for the account may be expanded to include Olympics and/or Winter sports; and/or (ii) topics that are connected to at least one common node in a topic ontology model, e.g., if the account has an interest of figure skating, and the topic ontology model is as shown in FIG. 8, then interests for the account may be expanded to include Olympics, Winter sports and/or biathlon.

In another embodiment of the invention, the recommendations may include displaying (or otherwise providing) one or more platform messages to the account, where the platform messages are from $3^{rd}$ party accounts that the account is not currently following (or otherwise related to) and where the $3^{rd}$ party accounts are associated with the expertise topics corresponding to one or more interests of the account. Further, as discussed above, topic ontology models may be used to determine other interests for the account. The additional interests may then be used to identify other $3^{rd}$ party accounts and, platform messages from such $3^{rd}$ party accounts may be subsequently displayed (or otherwise provided) to the account.

In another embodiment of the invention, the recommendations may include advertisements (which may also be native advertisements) where the advertisements correspond to a product or service related to at least one interest associated with the account as determined in FIG. 5 (including interests determined using one or more topic ontology models). Once the appropriate advertisements are determined, they are displayed to one or more users of the account via one or more client devices. The advertisements may be obtained from any known source include, but not limited to, an advertising exchange operatively connected to the social network platform.

The method shown in FIG. 5 results in the generation of derived interests for an account, i.e., interests that are derived from $3^{rd}$ party accounts that account is following versus interests that one or more users of the account has specified. Accordingly, the derived interests for a given account may change over time as the $3^{rd}$ party accounts that the account is following change and/or as the expertise topics associated with the $3^{rd}$ party accounts that the user is following change (e.g., as the result of performing the method shown in FIG. 4 at various times, e.g., once a week).

The following is an example of the method shown in FIG. 5. The example is not intended to limit the scope of the invention. Turning to the example, consider a scenario in which an account follows the following accounts account A (expertise topic basketball); account C (expertise topic—figure staking), account E, account, F, and account G. Based on the processing shown in FIG. 5, the following interests may be derived—basketball and figure skating. The derived interests may be used to generate recommendations that include: (i) accounts with figure skating expertise to follow;

(ii) an advertisement for basketball tickets, and (iii) an a platform message for a $3^{rd}$ party account that includes winter sports as an expertise topic.

In one or more embodiments of the invention, if an account "engages" with a recommendation which may include: (i) any of the engagement types described above and (ii) the account starts following a $3^{rd}$ party account that was including in a recommendation, then the interest associated with that recommendation may be deemed a verified interest. For example, if the result of the processing in FIG. 5 results a derived interest of figure staking and fashion and, as a result, the account is presented with an advertisement for figure skating lessons and an advertisement to purchase a dress from a high-end fashion designer. Further, assume that the account only engages with the advertisement for figure skating lessons. In view of this, the figure skating interest may be deemed a verified interest. At this point, further recommendations may be provided that are related to figure skating. However, fewer or no recommendations may be made that are related to fashion.

Figure 6:
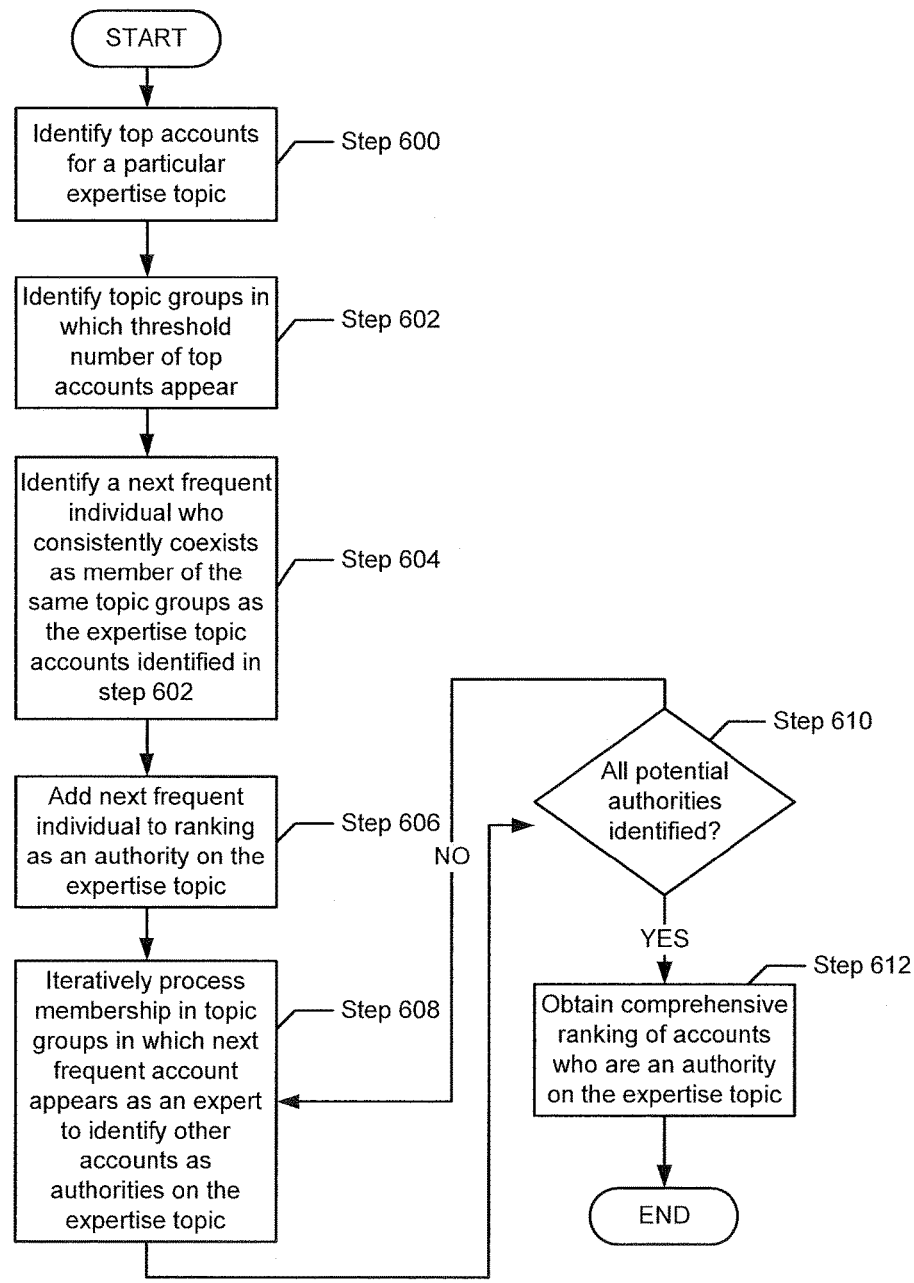
FIG. 6 shows a method for determining authorities on an expertise topic in accordance with one or more embodiments of the invention.

FIG. 6 shows a method for determine authorities of an expert topic that may be identified by the method of FIG. 3 discussed above. Specifically, FIG. 6 describes using results from the iterative method of FIG. 3 to identify individual accounts of an expertise topic group that are authorities on the expert topic (i.e., to obtain an authority account topic group on the expert topic). The method shown in FIG. 6 may be performed in parallel (or during overlapping time periods) with FIGS. 3-5. In step 600, the top accounts for a particular expertise topic are identified. This may be implemented by looking to the most popular accounts that appear in the topic group of an identified expertise topic. The most popular individuals may be identified by determining which individuals most frequently appear as members in the expertise topic group. For example, in the expert topic group "technology," the most popular accounts may be Bill Gates, Tim Cook, and Elon Musk. In one or more embodiments of the invention, step 600 of FIG. 6 may leverage the method described in FIG. 3 above, by using the collapsed topic groups that form expertise topics to identify and determine the most popular accounts associated with a given expertise topic. Alternatively, in one or more embodiments of the invention, the most frequently appearing accounts weighted by the number of followers may be used as the metric for determining the top accounts in an expertise topic. Regardless of the metric used, more generally, in observing the account membership for a particular expertise topic obtained as a result of the method of FIG. 3, the social network platform is able to identify the top ranked accounts of the expertise topic with a reasonable level of certainty.

In step 602, topic groups in which a threshold number of top accounts appear are identified. For example, the threshold number of top accounts from the identified top accounts in step 600 may be three. Thus, topic groups for the expertise topic in which at least three of the most popular accounts appear as members may be identified. Those skilled in the art will appreciate that the threshold number of top accounts required in the algorithm to determine authorities of a given expertise topic may vary.

In one or more embodiments of the invention, step 600 may also be performed without leveraging the results of the method of FIG. 3. For example, top accounts in a particular expertise topic may be identified using a social network user's knowledge of the field. For example, if a social network user has experience in or knowledge about a particular expertise topic, then the user may seek out the most popular accounts within that expertise topic manually, using those individual's names or related names of accounts in step 602 to determine which topic groups the top three accounts appear as members.

In step 604, accounts which are consistently found to be members of the same topic groups in which the top accounts are found are identified. For example, in the technology expertise topic, there may one or more accounts which appear as members of the topic group in which all three accounts named Bill Gates, Tim Cook, and Elon Musk appear, but who are not yet identified as authorities on the expertise topic. This account is then added to the authorities ranking being compiled as the method of FIG. 6 executes in step 606, and this identified account may be ranked as the next prominent account for the expertise topic group after Bill Gates, Tim Cook, and Elon Musk, as an authority on the expertise topic. In one or more embodiments of the invention, the topic ontology model described in FIG. 4 for expertise topic "technology" may be used in step 604 to identify other parent or child related topic groups in which the top ranked technology accounts appear. Alternatively, any random topic group in which at least three of the top ranked accounts appear as members may be processed to determine the next frequent account that coexists with those of Bill Gates, Tim Cook, and Elon Musk. For example, the next account that coexists with Bill Gates, Tim Cook, and Elon Musk in membership of the topic group with an expertise topic "computer technology" which may be a child node of the expertise topic "technology" may be Mark Zuckerberg. In this case, Mark Zuckerberg is identified as appearing as a member of the technology topic group in step 604, and this account is added to the top authorities on the expertise topic "technology" in step 606.

Those skilled in the art will appreciate that the topic groups processed as part of the method of FIG. 6 are not limited to topic groups that are related to the expertise topic initially chosen as the starting point for the authority ranking. Rather, any related or unrelated topic group having the top authorities/accounts identified in step 600 may be processed to identify the next prominent account as an authority for a particular expertise topic.

In step 608, the process repeats iteratively, with the next frequent account added in step 604 being part of the identified top accounts. Thus, topic groups having the threshold number of accounts from the expanded authorities ranking are processed to identify further accounts which coexist with the top authorities. This iterative process continues in steps 608 and 610 until no further accounts appear in a pattern along with those ranked as authorities for a given expertise topic. In one or more embodiments of the invention, in step 610, when the number of non-processed topic groups having the threshold number of top authorities is less than a predetermined threshold (i.e., when less than a threshold number of accounts are identified as coexisting with the determined authorities of an expertise topic), a ranking of individuals who are an authority on the expertise topic is obtained in step 612.

Those skilled in the art will appreciate that for the method described in FIG. 6, the name of the topic groups or expertise topic and the semantics associated therewith are not relevant. Rather, the method of FIG. 6 utilizes the membership accounts of the expertise topic to determine the foremost experts or "authorities" of that expertise topic. Using the method of FIG. 6 a comprehensive authorities ranking for an expertise topic may be built, which includes the key accounts for that expertise topic.

Those skilled in the art will appreciate that the greater the expansion of the membership accounts that are processed, the greater the chance of noisy results, i.e., outliers in the data that is processed. Accordingly; in one embodiment of the invention, in order to reduce the likelihood of noisy results, method shown in FIG. 6 may be initiated with the threshold number of top accounts for a given expertise topic because the next account identified using the algorithm of FIG. 6 is more likely to be an authority when starting with an aggregate number of accounts in this manner. Further, while popularity (e.g., frequency of occurrence, number of followers, etc.) of an individual member of an expertise topic group may be a first factor regarding the account being an authority on the topic, the method described above may use other factors in determining the topmost ranked accounts for an expertise topic.

The following is an example of the method shown in FIG. 6. The example is not intended to limit the scope of the invention. Turning to the example, consider a scenario in which, after step 600, the five top accounts identified as the top accounts for an expertise topic group are Accounts A, B, C, D, and E. Three topic groups and their corresponding member accounts are shown in Table 4. These topic groups are analyzed to determine further authorities on the expertise topic as described in the example below.

TABLE 4

| Topic Group (TG) | Member Accounts |
| --- | --- |
| 1 | A, D, E, F, G, H, |
| 2 | A, C, F, G, M, N, O |
| 3 | C, D, E, G, Y, Z |

During the first pass, TGs 1 and 3 are identified as having at least the threshold number (i.e., three in this example) of top accounts for the given expertise topic. Specifically, TG 1 has top accounts A, D, and E, and TG 3 has top accounts C, D, and E, as members. Those skilled in the art will appreciate that the topic groups 1-3 may be related to the chosen expertise topic by the topic ontology model described above, or may be any random topic groups being processed according to the method of FIG. 6.

Next, TGs 1 and 3 are processed to determine the next most frequent account that appears as a member of the identified TGs. Through this analysis of TGs 1 and 3, Account G is identified as the next most frequent account which coexists with at least three of the previously identified top accounts for the expertise topic. Accordingly, Account G is added as a ranked authority on the chosen expertise topic below accounts A-E. The top accounts for the expertise topic now includes A-E and G. The iterative process continues with Account G identified as a ranked authority. This results in TG 2 now having at least three of identified top authorities for the expertise topic. During the third iteration, it is determined that Account F appears next most frequently with top authority accounts for the expertise topic, as Account F is common between TG 1 and TG 2. Accordingly, Account F is added to the ranking of authorities below Account G.

The above iterative process continues until less than a threshold number of accounts remain unprocessed. In this example, once Account F is added to the ranking of authorities on the expertise topic, the process ends because there are no further accounts which coexist frequently among topic groups with Accounts A-E, G, and F. The comprehensive ranking of accounts for a particular expertise topic obtained from the process of FIG. 6 may be published to social media network users. Further, the process described in FIG. 6 may be repeated for any expertise topic in which the top accounts are identifiable.

While the above discussion indicates that the social network platform performs the methods shown in FIGS. 3-6, one or more steps may be performed by an entity (entities) (e.g., a service) executing external to the social network platform. In such scenarios, the social network platform provides the information that is necessary to perform the one or more steps to the entity and then receives the correspond results from the entity that performed by the one or more steps.

Figure 7:
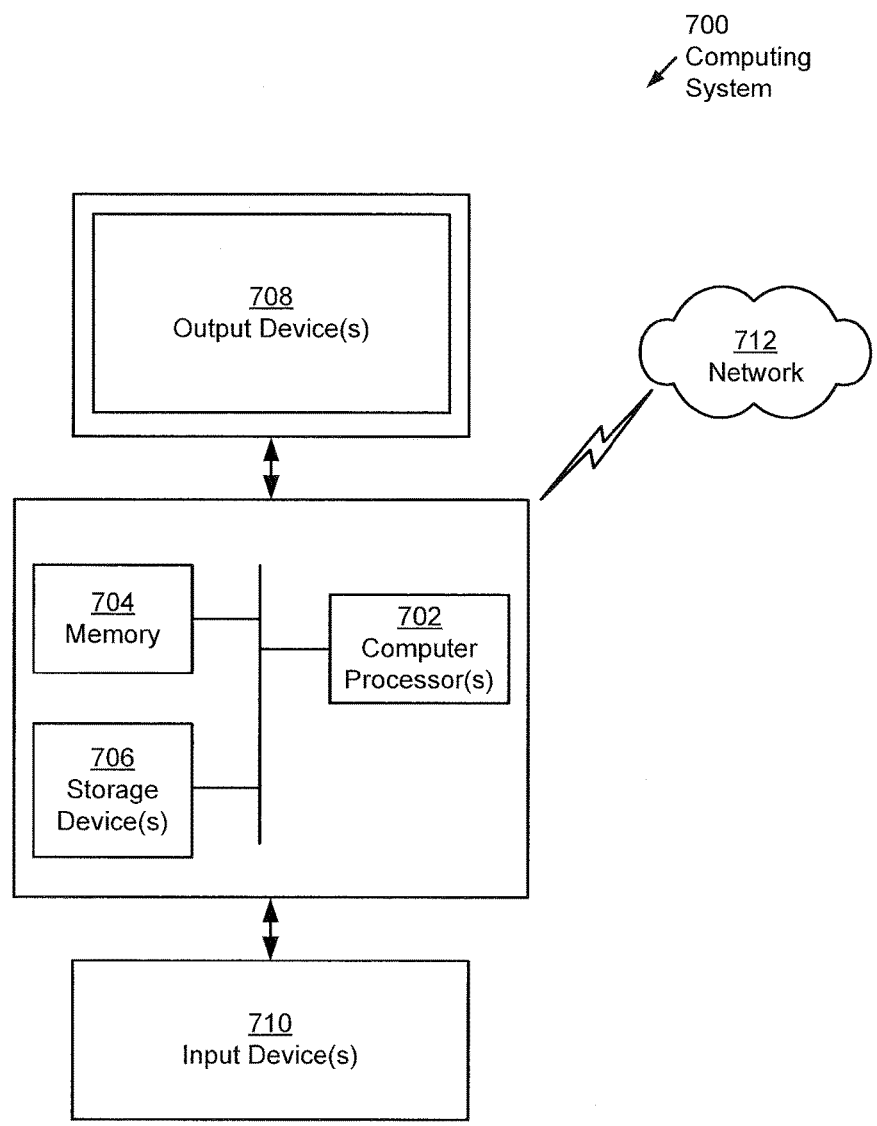
FIG. 7 shows a computing system in accordance with one or more embodiments of the invention.

Embodiments of the invention may be implemented on virtually any type of computing system regardless of the platform being used. For example, the computing system may be one or more mobile devices (e.g., laptop computer, smart phone, personal digital assistant, tablet computer, or other mobile device), desktop computers, servers, blades in a server chassis, or any other type of computing system or devices that includes at least the minimum processing power, memory, and input and output device(s) to perform one or more embodiments of the invention. For example, as shown in FIG. 7, the computing system (700) may include one or more computer processor(s) (702), associated memory (704) (e.g., random access memory (RAM), cache memory, flash memory, etc.), one or more storage device(s) (706) (e.g., a hard disk, an optical drive such as a compact disk (CD) drive or digital versatile disk (DVD) drive, a flash memory stick, etc.), and numerous other elements and functionalities. The computer processor(s) (702) may be an integrated circuit for processing instructions. For example, the computer processor(s) may be one or more cores, or micro-cores of a processor. The computing system (700) may also include one or more input device(s) (710), such as a touchscreen, keyboard, mouse, microphone, touchpad, electronic pen, or any other type of input device. Further, the computing system (700) may include one or more output device(s) (708), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (700) may be connected to a network (712) (e.g., a local area network (LAN), a wide area network (WAN) such as the Internet, mobile network, or any other type of network) via a network interface connection (not shown). The input and output device(s) may be locally or remotely (e.g., via the network (712)) connected to the computer processor(s) (702), memory (704), and storage device(s) (706). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (700) may be located at a remote location and connected to the other elements over a network (712). Further, embodiments of the invention may be implemented on a distributed system having a plurality of nodes, where each portion of the invention may be located on a different node within the distributed system. In one embodiment of the invention, the node corresponds to a distinct computing system. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for generating a topic ontology model and using the topic ontology model for providing recommendations, the method comprising:
    obtaining data representing accounts that are associated with respective topics, each of the accounts being an account of a social network platform, each of the respective topics being an expertise topic of the account, and each of the accounts being associated with two or more respective topics;
    ranking the topics associated with each account on a per account basis such that every account is associated with a ranked list of topics;
    limiting the size of each ranked list to a top N topics, wherein N is initially a predetermined integer greater than one;
    determining how many of the accounts are associated with each of the topics in the ranked lists;
    identifying all topics associated with a number of accounts that is less than a threshold number of accounts, and for each of the identified topics:
        creating a child node for the identified topic;
        determining a parent node for the child node, including determining a highest ranked topic other than the identified topic in each of the ranked lists in which the identified topic appears and creating a parent node for a most frequently occurring topic among the highest ranked topics; and
        generating a parent-child relationship between the parent node and the child node;
    if N is greater than one, decrementing N by one and repeating the operations of limiting, determining, identifying and decrementing until N, before the decrementing, is equal to one;
    when N is equal to one, combining the parent-child relationships generated in the generating operations to generate a topic ontology model;
    after generating the topic ontology model, identifying, for a first account, a related topic from (i) interests of the account including a first interest of the first account and (ii) the topic ontology model, the first account being an account of the social network platform, the related topic not being one of the interests of the first account, wherein identifying the related topic includes finding the related topic by finding in the topic ontology model a first node corresponding to the first interest of the account and a related node connected closely to the first node, wherein the related node is connected closely by virtue of being a direct parent of the first node, a direct grandparent of the first node, or a child of the direct parent or the direct grandparent;
    generating a recommendation for the first account based on the related topic; and
    providing the recommendation to the first account.

2. The method of claim 1, wherein obtaining data representing accounts that are associated with respective topics comprises obtaining data that associates accounts with respective normalized sets of topics, each normalized set including exactly two topics.

3. The method of claim 1, wherein the ranking of topics for each account indicates a relative strength of expertise of the account for the topics associated with the account.

4. The method of claim 1, wherein the threshold number of accounts is four.

5. The method of claim 1, wherein the value of N is initially ten.

6. The method of claim 1, wherein:
    the recommendation is a recommendation to follow a second account that has the related topic as an expertise topic of the second account.

7. The method of claim 1, wherein:
    providing the recommendation comprises providing a platform message to the first account, wherein the platform message is from a third account that the first account is not following or otherwise related to, and wherein the third account has the related topic as an expertise topic of the third account.

8. A non-transitory computer readable medium comprising instructions that, when executed by a computer processor, perform a method for generating a topic ontology model and using the topic ontology model for providing recommendations, the method comprising:
    obtaining data representing accounts that are associated with respective topics, each of the accounts being an account of a social network platform, each of the respective topics being an expertise topic of the account, and each of the accounts being associated with two or more respective topics;
    ranking the topics associated with each account on a per account basis such that every account is associated with a ranked list of topics;
    limiting the size of each ranked list to a top N topics, wherein N is initially a predetermined integer greater than one;
    determining how many of the accounts are associated with each of the topics in the ranked lists;
    identifying all topics associated with a number of accounts that is less than a threshold number of accounts, and for each of the identified topics:
        creating a child node for the identified topic;
        determining a parent node for the child node, including determining a highest ranked topic other than the identified topic in each of the ranked lists in which the identified topic appears and creating a parent node for a most frequently occurring topic among the highest ranked topics; and
        generating a parent-child relationship between the parent node and the child node;
    if N is greater than one, decrementing N by one and repeating the operations of limiting, determining, identifying and decrementing until N, before the decrementing, is equal to one;
    when N is equal to one, combining the parent-child relationships generated in the generating operations to generate a topic ontology model;
    after generating the topic ontology model, identifying, for a first account, a related topic from (i) interests of the account including a first interest of the first account and (ii) the topic ontology model, the first account being an account of the social network platform, the related topic not being one of the interests of the first account, wherein identifying the related topic includes finding the related topic by finding in the topic ontology model a first node corresponding to the first interest of the account and a related node connected closely to the first node, wherein the related node is connected closely by virtue of being a direct parent of the first node, a direct grandparent of the first node, or a child of the direct parent or the direct grandparent;

generating a recommendation for the first account based on the related topic; and providing the recommendation to the first account.

9. The non-transitory computer readable medium of claim 8, wherein obtaining data representing accounts that are associated with respective topics comprises obtaining data that associates accounts with respective normalized sets of topics, each normalized set including exactly two topics.

10. The non-transitory computer readable medium of claim 8, wherein the ranking of topics for each account indicates a relative strength of expertise of the account for the topics associated with the account.

11. The non-transitory computer readable medium of claim 8, wherein the threshold number of accounts is four.

12. The non-transitory computer readable medium of claim 8, wherein the value of N is initially ten.

13. The non-transitory computer readable medium of claim 8, wherein:

the recommendation is a recommendation to follow a second account that has the related topic as an expertise topic of the second account.

14. The non-transitory computer readable medium of claim 8, wherein:

providing the recommendation comprises providing a platform message to the first account, wherein the platform message is from a third account that the first account is not following or otherwise related to, and wherein the third account has the related topic as an expertise topic of the third account.

15. A system for generating a topic ontology model and using the topic ontology model for providing recommendations, the system comprising:

a social network platform implemented on one or more computers and configured to connect to a plurality of client devices, each client device being associated with an account managed by the social network platform; and an account repository comprising a plurality of accounts which are members of the social network platform, the social network platform being configured to generate a topic ontology model and using the topic ontology model to provide recommendations to the plurality of accounts by:

obtaining data representing accounts that are associated with respective topics, each of the accounts being an account of a social network platform, each of the respective topics being an expertise topic of the account, and each of the accounts being associated with two or more respective topics;

ranking the topics associated with each account on a per account basis such that every account is associated with a ranked list of topics;

limiting the size of each ranked list to a top N topics, wherein N is initially a predetermined integer greater than one;

determining how many of the accounts are associated with each of the topics in the ranked lists;

identifying all topics associated with a number of accounts that is less than a threshold number of accounts, and for each of the identified topics:

creating a child node for the identified topic;

determining a parent node for the child node, including determining a highest ranked topic other than the identified topic in each of the ranked lists in which the identified topic appears and creating a parent node for a most frequently occurring topic among the highest ranked topics; and generating a parent-child relationship between the parent node and the child node;

if N is greater than one, decrementing N by one and repeating the operations of limiting, determining, identifying and decrementing until N, before the decrementing, is equal to one;

when N is equal to one, combining the parent-child relationships generated in the generating operations to generate a topic ontology model;

after generating the topic ontology model, identifying, for a first account, a related topic from (i) interests of the account including a first interest of the first account and (ii) the topic ontology model, the first account being an account of the social network platform, the related topic not being one of the interests of the first account, wherein identifying the related topic includes finding the related topic by finding in the topic ontology model a first node corresponding to the first interest of the account and a related node connected closely to the first node, wherein the related node is connected closely by virtue of being a direct parent of the first node, a direct grandparent of the first node, or a child of the direct parent or the direct grandparent;

generating a recommendation for the first account based on the related topic; and providing the recommendation to the first account.

16. The system of claim 15, wherein obtaining data representing accounts that are associated with respective topics comprises obtaining data that associates accounts with respective normalized sets of topics, each normalized set including exactly two topics.

17. The system of claim 15, wherein the ranking of topics for each account indicates a relative strength of expertise of the account for the topics associated with the account.

18. The system of claim 15, wherein the threshold number of accounts is four.

19. The system of claim 15, wherein the value of N is initially ten.

20. The system of claim 15, wherein:

the recommendation is a recommendation to follow a second account that has the related topic as an expertise topic of the second account.

21. The system of claim 15, wherein:

providing the recommendation comprises providing a platform message to the first account, wherein the platform message is from a third account that the first account is not following or otherwise related to, and wherein the third account has the related topic as an expertise topic of the third account.

* * * * *